(12) United States Patent
Roether et al.

(10) Patent No.: US 9,133,956 B2
(45) Date of Patent: Sep. 15, 2015

(54) ELECTROMAGNETIC VALVE DEVICE WITH AN ARMATURE GUIDING TUBE WHICH IS SUPPORTED AT THE HEAD SIDE AND RELIEVED OF LOADING ON THE FLOOR SIDE

(75) Inventors: Friedbert Roether, Cleebronn (DE); Reiner Maerkle, Ingersheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 102 days.

(21) Appl. No.: 13/806,081

(22) PCT Filed: Jun. 14, 2011

(86) PCT No.: PCT/EP2011/059804
§ 371 (c)(1),
(2), (4) Date: Mar. 1, 2013

(87) PCT Pub. No.: WO2011/160980
PCT Pub. Date: Dec. 29, 2011

(65) Prior Publication Data
US 2013/0153800 A1      Jun. 20, 2013

(30) Foreign Application Priority Data
Jun. 24, 2010   (DE) .......................... 10 2010 024 943

(51) Int. Cl.
*F16K 31/06* (2006.01)
*H01F 7/08* (2006.01)

(52) U.S. Cl.
CPC ......... *F16K 31/0675* (2013.01); *F16K 31/0648* (2013.01); *F16K 31/0655* (2013.01); *H01F 7/088* (2013.01)

(58) Field of Classification Search
CPC ............ F16K 31/0648; F16K 31/0655; F16K 31/0658; F16K 31/0675; H01F 7/088

USPC ............ 251/129.02, 129.15, 129.21; 335/278
See application file for complete search history.

(56) References Cited

U.S. PATENT DOCUMENTS 5,820,228 A * 10/1998 Schneider et al. .......... 303/119.3
6,065,734 A *  5/2000 Tackett et al. ............ 251/129.02
(Continued)

FOREIGN PATENT DOCUMENTS

| AT | 382 699 | 3/1987 |
|----|---------|--------|
| CN | 101228380 | 7/2008 |

(Continued)

OTHER PUBLICATIONS

International Search Report for PCT/EP2011/059804 dated Jun. 14, 2011.
(Continued)

*Primary Examiner* — Matthew W Jellett
(74) *Attorney, Agent, or Firm* — Kenyon & Kenyon LLP

(57) ABSTRACT

An electromagnetic valve device includes an armature body; a coil housing; a static, hollow cylindrical armature guide tube; and at least one electromagnetic coil interacting with the armature body and accommodated in the coil housing; the armature body being guided in the static, hollow cylindrical armature guide tube and can abut against a head part, which closes off the armature guide tube at the head side, of the armature guide tube extending through a central passage opening of the housing and through a central opening in a yoke disk at the base side as to the coil and at least partially engaging under the yoke disk by a radially outwardly projecting annular base part, in which, for axial support of the head part, the head part is at least partially engaged over by a coil housing support part that makes contact with the head part in a contact region.

10 Claims, 1 Drawing Sheet

(56) References Cited

U.S. PATENT DOCUMENTS

| | | |
|---|---|---|
| 6,761,565 B2 | 7/2004 | Ito et al. |
| 2001/0048086 A1* | 12/2001 | Parsons et al. ............ 251/129.04 |
| 2003/0087536 A1 | 5/2003 | Ito et al. |
| 2005/0279957 A1* | 12/2005 | Inami et al. .............. 251/129.15 |
| 2007/0181839 A1* | 8/2007 | Tsuchizawa et al. .... 251/129.15 |
| 2010/0301248 A1* | 12/2010 | Yamamoto et al. ...... 251/129.15 |
| 2010/0308244 A1* | 12/2010 | Oikawa et al. ........... 251/129.15 |

FOREIGN PATENT DOCUMENTS

| | | |
|---|---|---|
| DE | 102 49 781 | 7/2003 |
| DE | 10 2005 049663 | 4/2007 |
| DE | 10 2007 026890 | 12/2008 |
| WO | 01/65159 | 9/2001 |

OTHER PUBLICATIONS

European Patent Office, International Preliminary Report on Patentability, Jan. 10, 2013, from International Patent Application No. PCT/EP2011/059804, filed on Jun. 14, 2011.

European Patent Office, English Translation of International Preliminary Report on Patentability, Jan. 10, 2013, from International Patent Application No. PCT/EP2011/059804, filed on Jun. 14, 2011.

* cited by examiner

ELECTROMAGNETIC VALVE DEVICE WITH AN ARMATURE GUIDING TUBE WHICH IS SUPPORTED AT THE HEAD SIDE AND RELIEVED OF LOADING ON THE FLOOR SIDE

FIELD OF THE INVENTION

The present invention relates to an electromagnetic valve device.

BACKGROUND INFORMATION

In electromagnetic valve devices or magnetic valves 1 of the type from the prior art, such as are shown in FIG. 1, an electromagnetic coil 6 is provided which interacts with an armature body 2 and which is accommodated in a coil housing 4. Here, the armature body 2 is guided in a static, hollow cylindrical armature guide tube 8 and can abut against a head part 10, which closes off the armature guide tube 8 at the head side, of the armature guide tube 8 which extends through a central passage opening 12 of the coil housing 4 and through a central opening 14 in a yoke disk 16 at the base side in relation to the coil 6 and which at least partially engages under the yoke disk 16 by means of a radially outwardly projecting annular base part 18.

The armature guide tube 8 is usually of very thin-walled form and has a wall thickness of approximately 0.2 to 0.3 mm. Here, the armature body 2 is preloaded against the head part 10 of the armature guide tube 8 by spring means and is moved in the direction of the core 22, which is held in the armature guide tube 8, by energization of the coil 6, for example in order to actuate a sealing element 25 which interacts with a valve seat 24. When the coil 6 is deenergized, the armature body 2 then bounces in a percussive manner against the head part 10 of the armature guide tube 8 owing to the spring forces. As a result, in particular the head part 10 and also the base part 18 are subject to extreme loading in each case at the edge-like transition to the cylindrical part 19 of the armature guide tube 8. This is because pulsed tensile forces are then exerted on the base part 18 which is supported axially from below against the yoke disk 16, whereas high dynamic compressive forces are exerted on the head part 10, as is easily conceivable from FIG. 1.

Consequently, in practice, the thin-walled armature guide tube 8 cracks in particular in the region of the head part 10 and of the base part 18 owing to the high dynamic axial forces during the impacting. A crack in the armature guide tube 8 then leads to undesired leakage in a pressure medium flow conducted in the magnetic valve 1, which is critical in particular in the case of safety-relevant magnetic valves such as are used for example in pressure-medium-actuated vehicle brake systems.

It has been found in practice that, owing to the typical damage symptoms described above, the armature guide tube 8 is the component most often responsible for a reduction in the service life of the magnetic valve 1.

SUMMARY OF THE INVENTION

Accordingly, the present invention is based on the object of further developing an electromagnetic valve device of the type mentioned in the introduction such that its reliability and service life are increased.

The object is achieved according to the present invention by the features described herein.

The present invention provides that, for the axial support of the head part, the head part is at least partially engaged over by a support part of the coil housing, which support part makes contact with the head part of the armature guide tube in a contact region, and "Base part" and "head part" are to be understood to mean those surfaces of the armature guide tube that are arranged perpendicular to an axial central axis of the magnetic valve. Here, the surface parts may be produced in one piece with the cylindrical part of the armature guide tube or else may, as initially separate parts, be cohesively connected to the cylindrical part.

The armature body is preloaded against the head part of the armature guide tube by spring means which are supported at one side against an end surface, which points away from the base part of the armature guide tube, of the armature body and at the other side against an opposite end surface of a core which is held in the armature guide tube, and the armature body can be moved toward the core by the energization of the at least one electromagnetic coil.

The present invention then has the advantage that the head part of the armature guide body is supported on the coil housing, and in particular, the axial pressure forces acting on the head part for example owing to the impacting of the armature can be dissipated into the coil housing. In the head region of the magnetic valve there are then provided two walls which at least partially make contact, specifically firstly the wall of the head part of the armature guide tube and secondly the wall of the support part which supports the head part.

Overall, the described structural measures result in reduced loading of the armature guide tube and thus a reduced tendency for cracks to be able to form in the component. The service life and reliability of magnetic valves equipped with an armature guide tube designed in this way are thus increased.

Advantageous refinements and improvements of the present invention specified herein are possible by means of the measures specified in the subclaims.

It is particularly preferable for the base part of the armature guide tube to be spaced apart axially from the yoke disk by an empty chamber. This yields the advantage that the base part of the armature guide tube can now no longer be supported on the yoke disk owing to the axial spacing and the empty chamber situated in between. In this connection, "empty chamber" means that, between that end surface of the yoke disk which points toward the base part and the base part, no structures or components are provided via which a transmission of axial forces between the base part and the yoke disk could take place.

The described structural measures yield a further reduced loading of the armature guide tube and thus a reduced tendency for cracks to be able to form in the component. The service life and reliability of magnetic valves equipped with an armature guide tube designed in this way are thus increased.

It is furthermore particularly preferable for the contact region between the head part of the armature guide tube and the support part of the coil housing to form a central circular area, wherein the support part of the coil housing has for example an M-shaped cross section as viewed in longitudinal cross section, having a cylindrical part from which a web part which runs obliquely and toward the central contact region extends radially inward. In this way, the axial forces acting on the head part are transmitted firstly to the central circular-disk-shaped contact area and via the web part and the cylindrical part in the axial direction into the coil housing.

In one refinement, the support part completely covers or caps the coil housing of the head part. In other words, the support part is then of encircling, circular-area form as seen in plan view. The support part of the coil housing could alternatively be formed for example as a strip-like web and span the head part diametrically.

Further measures which improve the present invention will be discussed in more detail below together with the description of an exemplary embodiment of the present invention on the basis of the drawing.

DETAILED DESCRIPTION

Figures 1, 2:
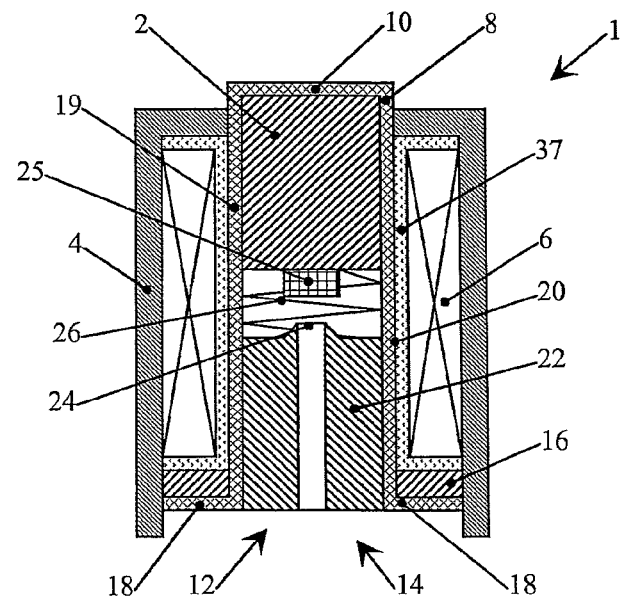
FIG. 1 shows a device of the related art.
FIG. 2 illustrates an exemplary embodiment of the present invention, and it shows a schematic cross section through the embodiment of an electromagnetic valve device.

The exemplary embodiment shown in FIG. 2 of a magnetic valve 1 for an electropneumatic brake device of a utility vehicle has an armature body 2 which interacts with an electromagnetic coil 6 accommodated in a coil housing 4. The armature body 2 is guided axially in a static, hollow cylindrical armature guide tube 8 and can abut against a head part 10, which closes off the armature guide tube 8 at the head side, of the armature guide tube 8. The armature guide tube 8 is formed for example as a deep-drawn part.

The armature guide tube 8 extends with its cylindrical part 19 through an axial central passage opening 12 of a coil body 37 held in the coil housing 4 and through a central opening 14 of a yoke disk 16 by means of which the coil housing 4, which is formed as a hollow cylinder with circular-disk-shaped cross section, is closed off at the base side. Here, the yoke disk 16 is at least partially engaged under, but without contact, by a radially outwardly projecting annular base part 18 of the armature guide tube 8.

The armature guide tube 8 is held for example on the radially inner circumferential wall of a radially inner cylindrical portion 20 of the coil body 37, on which portion the coil 6 is wound and which portion forms the central passage opening 12.

The armature guide tube 8 is closed off by the head part 10 at the head side and is open at the base side. Furthermore, on a core 22 which is held at the base side in the armature guide tube 8, there is formed at the head side a valve seat 24 which interacts with a sealing element 25, which is held on the armature body 2 at the base side, depending on an energization or deenergization of the coil 6. The coil housing 4 furthermore has a plug terminal (not visible here) for the electrical contacting of the coil 6.

The armature body 2 is preloaded against the closed head part 10 of the armature guide tube 8 by spring means 26 which are supported at one side against an end surface, which points away from the base part 18 of the armature guide tube 8, of the armature body 2 and at the other side against an opposite end surface of the core 22 which is held in the armature guide tube 8, and the armature body can be moved toward the core 22 by energization of the at least one electromagnetic coil 6, whereby the sealing element 25 seals against the valve seat 24. By contrast, in the event of a deenergization of the coil 6, the armature body 2 is forced in the direction of the head part 10 of the armature guide tube 8 by the spring forces of the pressure spring 26, whereby the sealing element 25 is lifted from the valve seat 24, and a flow duct 27 formed centrally in the core is opened up.

The armature body 2, the coil housing 4, the yoke disk 16 and the core 22 are manufactured from a ferromagnetic material. The yoke disk 16 serves in a known way to form, when the coil 6 is energized, a magnetic return path for the magnetic field which runs through the coil 6, the armature body 2, the coil housing 4 and the core 22. More precisely, the armature body 2 serves in a known electromagnetic manner to close a magnetic circuit together with the yoke disk 16 and the core 22, such that when the coil 6 is energized, the armature body 2 is moved in the axial direction (vertical direction in FIG. 2) in order to open or close the magnetic valve 1.

For the axial support of the head part 10, the head part is spanned or engaged over diametrically by a support part 28 of the coil housing 4, which support part makes contact with the head part 10 of the armature guide tube 8 in a contact region 30. Furthermore, the base part 18 of the armature guide tube 8 is spaced apart axially from the yoke disk 16, more precisely from the base-side end surface of which, by an empty chamber 32.

It is particularly preferable for the contact region 30 between the head part 10 of the armature guide tube 8 and the support part 28 of the coil housing 4 to form a central circular-disk-shaped area, wherein the support part 28 of the coil housing 4 has for example an M-shaped cross section as viewed in longitudinal cross section, as can be seen from FIG. 2.

The support part 28 then has a cylindrical part 34 from which a web part 36 which runs obliquely toward the central contact region 30 extends radially inward. The circular-disk-shaped contact region 30 with the head part 10 is then situated in the central region of the web part 36. The portions 28, 34, 36 and the rest of the coil housing 4 are for example formed in one piece, in particular as a deep-drawn part, from ferromagnetic material.

In this way, the axial forces acting on the head part 10 are transmitted initially to the central circular-disk-shaped contact region 30 and are transmitted as purely tensile forces via the web part 36 to the cylindrical part 34 running in the axial direction, and are introduced from there into the rest of the coil housing 4.

The support part 28 of the coil housing 4 covers or caps the head part 10 preferably completely. In other words, the support part 28 is then of encircling, circular-area form as seen in plan view. The support part 28 could alternatively also be formed by a strip-like web which duly bridges the head part 10 completely but only partially covers the surface thereof.

The static and dynamic forces acting on the armature guide tube 8 (owing to an actuation of the solenoid valve 1) are therefore dissipated into the coil housing 4 firstly via the connection between the armature guide tube 8 and the inner cylindrical portion 20 of the coil housing 4, and secondly via the radially inner circumferential surface of the yoke disk 16, and also via the head-side support part 28.

LIST OF REFERENCE NUMERALS

1 Magnetic valve
2 Armature body
4 Coil housing
6 Coil
8 Armature guide tube
10 Head part
12 Passage opening
14 Opening
16 Yoke disk
18 Base part
19 Cylindrical part 20 Portion
22 Core
24 Valve seat
25 Sealing element
26 Pressure spring
27 Flow duct
28 Support part
30 Contact region
32 Empty chamber
34 Cylindrical part
36 Web part
37 Coil body

The invention claimed is:

1. An electromagnetic valve device, comprising:
an armature body;
a coil housing;
a static, hollow cylindrical armature guide tube; and
at least one electromagnetic coil which interacts with the armature body and which is accommodated in the coil housing;
wherein the armature body is guided in the static, hollow cylindrical armature guide tube and can abut against a head part, which closes off the armature guide tube at a head side, of the armature guide tube which extends through a central passage opening of the coil housing and through a central opening in a yoke disk at a base side of the armature guide tube in relation to the coil and which at least partially engages under the yoke disk by a radially outwardly projecting annular base part,
wherein, for axial support of the head part, the head part is at least partially engaged over by a support part of the coil housing,
wherein the support part makes contact with the head part in a contact region,
wherein the base part of the armature guide tube is spaced apart axially from the yoke disk by an empty chamber,
wherein the base part is an integral part of the armature guide tube,
wherein the base part defines and bounds one side of the empty chamber, and the yoke disk defines and bounds an opposite side of the empty chamber,
wherein the contact region between the head part of the armature guide tube and the support part of the coil housing forms a central circular-disk-shaped area,
wherein the support part of the coil housing has an M-shaped cross section as viewed in longitudinal cross section, having a cylindrical part from which a web part which runs obliquely and toward the central contact region extends radially inward,
wherein the circular-disk-shaped area with the head part is situated in a central region of the web part,
wherein the support part, the cylindrical part and the web part and the rest of the coil housing are formed in one piece from ferromagnetic material, and
wherein the cylindrical part extends above an annular top edge of the coil housing.

2. The valve device of claim 1, wherein the armature body is preloaded against the head part of the armature guide tube by a spring arrangement which is supported at one side against an end surface, which is displaced from the base part of the armature guide tube, of the armature body and at the other side against an opposite end surface of a core which is held in the armature guide tube, and the armature body is movable toward the core by the energization of the at least one electromagnetic coil.

3. The valve device of claim 1, wherein the yoke disk is configured so as to form a magnetic return path.

4. The valve device of claim 1, wherein the support part of the coil housing completely covers the head part.

5. The valve device of claim 1, wherein the support part of the coil housing is in the form of a strip web and spans the head part diametrically.

6. The valve device of claim 1, wherein the support part of the coil housing spans the head part diametrically, and wherein the contact region between the head part of the armature guide tube and the support part of the coil housing forms a central circular-disk-shaped area.

7. The valve device of claim 6, wherein the armature body is preloaded against the head part of the armature guide tube by a spring arrangement which is supported at one side against an end surface, which is displaced from the base part of the armature guide tube, of the armature body and at the other side against an opposite end surface of a core which is held in the armature guide tube, and the armature body is movable toward the core by the energization of the at least one electromagnetic coil.

8. The valve device of claim 6, wherein the yoke disk is configured so as to form a magnetic return path, and wherein the support part of the coil housing completely covers the head part.

9. The valve device of claim 1, wherein the yoke disk is configured so as to form a magnetic return path, and wherein the support part of the coil housing completely covers the head part.

10. The valve device of claim 1, wherein axial forces acting on the head part are transmitted to the central circular-disk-shaped area and are transmitted as tensile forces via the web part to the cylindrical part running in the axial direction, and are introduced from there into the rest of the coil housing.

* * * * *